INVENTORS
THOMAS HUTSON, JR
R. E. RITTER
BY
ATTORNEYS

United States Patent Office 3,709,951
Patented Jan. 9, 1973

3,709,951
METHOD OF CONTROLLING AN OXIDATIVE DEHYDROGENATION
Thomas Hutson, Jr., Bartlesville, Okla., and Ronald E. Ritter, Columbia, Md., assignors to Phillips Petroleum Company
Continuation of abandoned application Ser. No. 733,177, May 29, 1968. This application May 17, 1971, Ser. No. 144,287
Int. Cl. C07c 5/18
U.S. Cl. 260—680 E                    10 Claims

ABSTRACT OF THE DISCLOSURE

A method of optimizing production of reaction products from a reaction zone in which occur primary and secondary reactions by measuring the content of one of the secondary reaction reactants in the effluent from the reaction zone and controlling a primary variable of the reaction zone in accordance therewith.

---

This is a continuation of my application Ser. No. 733,177, filed May 29, 1968 and now abandoned.

This invention relates to a method of controlling chemical reactions. In one of its more specific aspects, this invention relates to controlling the process of the oxidative dehydrogenation of olefins to conjugated diolefins within optimum limits.

Certain chemical reactions involve both primary and secondary reactions within a common reaction zone. The term "primary reaction," as used herein, shall refer to that reaction which produces the primary or principal product, that is, the desired product from the process. By the term "secondary reaction," as used herein, shall be meant those reactions which also occur within the reaction zone but which do not produce the principally desired product. Frequently, one of the reactants introduced into the reaction zone takes part in both the primary and the secondary reactions.

It has now been determined that by measuring the concentration of a secondary reaction reactant in the effluent from the reaction zone and by controlling a principal variable of the primary reaction in accordance therewith, the primary reaction can be controlled to maximize production of the desirable product.

In the process of the nature concerned herein, there are considered to be both principal and secondary variables. Principal variables are those such as temperature and reactant concentration which are influential in controlling the primary reaction. Secondary variables are those variables less influential in affecting the primary reaction though they may be materially effective in respect to the secondary reactions.

According to this invention, there is provided a method for optimizing the production of primary products from a primary reaction occurring within a reaction zone wherein both primary and secondary reactions simultaneously occur and wherein at least one of the reactants is both a primary reaction reactant and a secondary reaction reactant which comprises measuring the content of the secondary reaction reactant in the product from the reaction zone and varying a principal variable of the primary reaction to maintain the content of the secondary reaction reactant in the effluent within predetermined limits.

Accordingly it is the object of this invention to provide a method for optimizing conditions within a reaction zone.

It is a further object of this invention to provide a process having optimum conditions for the oxidative dehydrogenation of butene to butadiene.

The method of this invention is particularly adaptable to controlling the process of the oxidative dehydrogenation of olefins to conjugated diolefins within optimum limits. Oxidative dehydrogenation of hydrocarbons involves the reaction of a monoolefin containing a chain of not less than four carbon atoms in the presence of oxygen and steam at high temperatures over a catalyst to produce related conjugated diolefins. Such conjugated diolefins have wide use in the polymer producing industry.

The primary reaction, in effect, involves removal of one hydrogen atom from each of two adjacent carbon atoms with the resulting formation of the conjugated diolefin. Two aspects of the reaction, conversion and selectivity, are of particular significance. "Conversion," as used herein, means that percentage of the original monoolefin which disappears during the course of the reaction. "Selectivity," as used herein, means that proportion of the original monoolefin which disappears and is converted into the desired product, the conjugated diolefin, during the course of the reaction.

Conversion and selectivity are important since, within the reaction zone, there occur a large number of side or secondary reactions in addition to that of the principal or primary reaction, which is the dehydrogenation, itself. A large proportion of these secondary reactions, that is, secondary in the sense that the formation of the conjugated diolefin is the primary reaction, involve the reaction of various materials with oxygen to form carbon dioxide, aldehydes, unsaturated aldehydes, acids, and the like. In other words, in the reaction zone there occurs a primary reaction which results in the production of the principal product, the conjugated diolefin, and secondary reactions which result in the formation of ancillary products or by-products.

Oxidative dehydrogenation of hydrocarbons is particularly adaptable to the method of this invention inasmuch as one class of materials, an organic compound, is both a primary reaction reactant and a secondary reaction reactant while an oxidant, specifically oxygen, is, at least insofar as appearing in the principal product of the primary or principal reaction, a secondary reaction reactant.

Interrelated therewith is the fact that there are in this process both primary and secondary variables, that is variables such as olefin concentration, temperature, pressure, oxygen concentration, and the like, which are influential in controlling either the primary reaction or the secondary reaction, or both.

In the process of this invention, a monoolefin whose formula contains a chain of not less than four carbon atoms, in admixture with steam and free oxygen is contacted with a catalyst under conditions of super-atmospheric pressure and elevated temperature to produce conjugated diolefins which may be recovered from the reactor effluent in any suitable manner, including extraction by an organic solvent, condensation or fractionation.

The invention is suited for processing olefins, cyclo-olefins and cycloparaffins as well as normal, branched paraffins, and alkyl aromatics. However, it is particularly suited for processing monoolefins, especially those having from four to six carbon atoms, and to an unusual degree, to the processing of butene and butadiene. It is in respect to this latter embodiment that the invention will be hereinafter described without, however, meaning to limit the invention in any degree thereby.

A typical feedstock would contain about 95 weight percent butene-2 isomers, for example, about 53 percent trans-butene-2 and about 42 percent cis-butene-2. Other components can be butene-1, saturated and unsaturated hydrocarbons of the ethyl and propyl group as well as isobutylene, 3-methyl-butene-1, butadiene-1,3 and the like.

The process can be performed over a large number of catalysts. One such catalyst is an antimony oxide catalyst, either as such, or in combination with oxides such as those of tin, molybdenum, tungsten or titanium.

Another suitable catalyst is a pelleted tin oxide promoted with about 6 percent phosphorous. Still another suitable catalyst is pelleted tin oxide promoted with about 4.5 percent phosphorous. Other catalysts include bismuth phosphate and iron phosphate precipitated from nitrate solution with phosphoric acid, and stannic phosphate.

A preferred catalyst, relative to which the process is hereinafter described, is a lithium-promoted tin-phosphate catalyst of ⅛ inch pellets which are impregnated with lithium nitrate and calcined. This catalyst contains about 12 weight percent phosphorous and about 2 weight percent lithium. It has a crush strength of about 13 pounds, a surface area of about 56 m.$^2$/g., a pore volume of about 0.30 ml./g., and a bulk density of about 1.2 g./cc.

The catalyst may be employed in the form of a fluidized bed or a fixed bed, either in batch or in continuous operation.

The reaction is preferably carried out at a superatmospheric pressure although it may be carried out at atmospheric pressure or at subatmospheric pressures. A pressure of about 1 to about 3 atmospheres, absolute is preferable.

The reaction is preferably carried out at temperatures below about 1200° F., and preferably at temperatures in the range of about 800° F. to about 950° F. Inasmuch as the reaction is exothermic, and the catalyst bed will vary considerably in temperature over its height, successful bed inlet temperatures are frequently lower than 800° F., particularly during the earlier portion of the process.

Contact time between the reactants and the catalyst may vary from about 0.1 to about 10 seconds, preferably from about 0.3 to about 1.0 second.

The reactants introduced to the catalytic reaction zone comprise hydrocarbon, steam and oxygen, which may be introduced as air. Nitrogen may also be included, or may be included to the exclusion of the steam, although steam is preferred because its high specific heat facilitates the absorption of the exothermic heat of the reaction.

Generally the oxygen to butene molal ratio will be about 0.20 to about 2.0, more frequently about 0.5 to about 1.0 with a molal ratio of about 0.6 to about 0.8 being preferred.

The steam to butene molal ratio will be about 10 to about 50, more frequently about 22 to about 30, with about 25 to about 26 being preferred.

The air to butene ratio will be about 1.2 to about 9.6 more frequently about 2.4 to about 4.8 with about 2.8 to about 3.9 being preferred.

If air is used as one of the reactants, the nitrogen of the air replacing the steam, with a 0.69:1 molal ratio of oxygen to butene being employed, the amount of oxygen in the reaction mixture will be about 16.1 percent. If steam, oxygen and butene are used in respective ratios of 25.1:0.69:1.0, the amount of oxygen in the reaction mixture will be about 2.6 mol percent, although the oxygen to butene ratio is the same in both instances. However, it has been found that the oxygen content of the reactor feed is not a primary process variable and, accordingly, is not an important driving force in promoting the oxidative dehydrogenation of the butene. Instead, it has been determined that at constant oxygen to butene ratio in the inlet feed, there is an oxygen content of the reactor effluent which, if maintained by adjusting the reaction temperature, will result in maximum, optimum conjugated diolefin production.

The optimum oxygen to butene ratio of the reactor effluent in relation to product yield for the catalytic vapor phase oxidative dehydrogenation of butene to butadiene over a lithium promoted tin oxide-tin phosphate catalyst when maintaining the oxygen to butene ratio in the range of about 0.6 to about 0.8, preferably about 0.69, as controlled by the inlet temperature of the reactants, has been found to be in the range of about 0.09 to about 0.13. On the basis of the inlet oxygen content, this corresponds to an average oxygen consumption of about 84 percent, or, conversely, to an oxygen survival of about 16 percent based on the oxygen charged.

It has been further discovered that when the oxygen concentration of the reaction effluent is measured and the reaction zone temperature, as represented by the reaction inlet temperature, is varied to give an oxygen survival in relation to the oxygen charged, conjugated diolefin production will be maximized.

The following examples further explain the invention.

EXAMPLE I

A series of reactions was conducted on a hydrocarbon charge stock of the following composition:

| Component: | Mol percent |
|---|---|
| Ethane and ethylene | 0.04 |
| Propane | 0.04 |
| Propylene | 0.04 |
| 2-butylene | <0.02 |
| Butene-1 | 3.39 |
| Trans-butene-2 | 52.90 |
| Cis-butene-2 | 43.60 |
| 3-methylbutene-1 | 0.01 |
| Butadiene-1,3 | <0.01 |
| Total | 100.0 |

The process was conducted under a pressure of about 2 atmospheres at a residence time of about 0.97 second. Air was introduced to supply the oxygen. The steam to oxygen to total butene molal ratios in the feed were about 25.1 to 0.69 to 1.00. The catalyst used was lithium-promoted tin phosphate catalyst as previously described.

The reactions were conducted under conditions of constant inlet reactant composition while varying the reaction inlet temperature to maintain the optimum mol percentage oxygen in the reactor effluent, and simultaneously determining the percentage yield of butadiene.

Typical analysis of the reactor effluent was as follows.

EXAMPLE II

| Component: | Mol percent |
|---|---|
| Ethane and ethylene | 0.53 |
| Propylene | 0.08 |
| 2-butylene, butene-1 | 0.96 |
| Trans-butene-2 | 1.03 |
| Cis-butene-2 | 1.55 |
| Butadiene-1,3 | 14.57 |
| Carbon dioxide | 2.24 |
| 2-butane | 0.02 |
| Oxygen | 3.62 |
| Nitrogen | 73.36 |
| Carbon monoxide | 2.00 |
| Other hydrocarbons | .04 |
| Total | 100.00 |

Some of the conversion data obtained were as follows:

| Mol percent oxygen unconsumed basis O charged | Reactor inlet temperature, ° F. | Butadiene yield, mol percent |
|---|---|---|
| 10 | 920 | 47.5 |
| 30 | 896 | 54 |
| 56 | 856 | 40 |
| 80 | 836 | 22.5 |

Complete data are indicated in the attached FIGS. 1 and 2 in which

Figure 1:
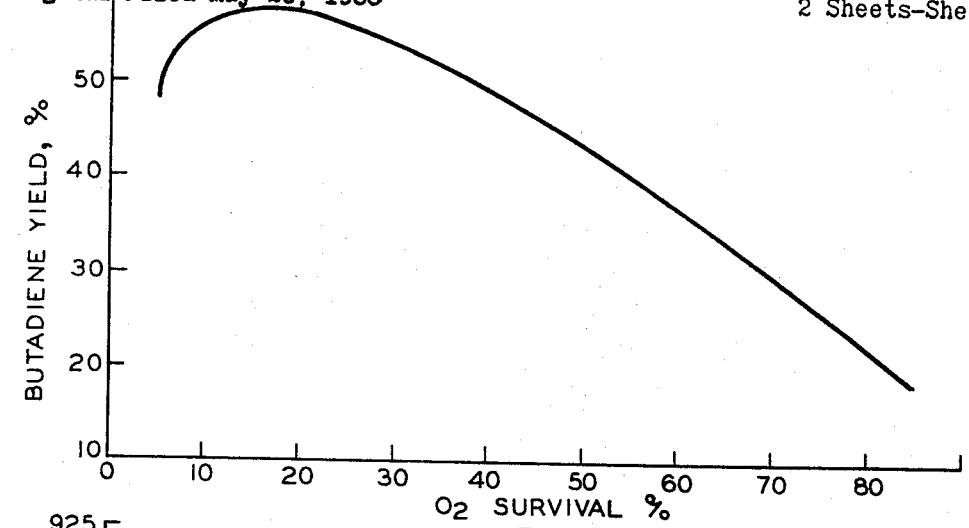
FIG. 1 is a graphic representation of the relationship between butadiene yield and oxygen survival as a percent of the reactor inlet oxygen remaining unconsumed in the reactor effluent.

Referring first to FIG. 1, under the conditions employed it will be seen that the yield of conjugated diolefin reaches a maximum in its relation to oxygen survival in the reactor effluent, reaching this maximum at between about 16 and about 18 percent oxygen survival; that is to say, while the yield of conjugated diolefin produced within the reaction zone increases from about 20 percent to about 57.5 percent as the oxygen consumption increases from about 15 percent to about 83 percent, further consumption of oxygen therebeyond is accompanied by a decrease in conjugated olefin production. Accordingly, the optimum percentage consumption of oxygen in respect to maximization of conjugated diolefin yields occurs at about 16 to 18 percent survival of that oxygen charged to the reaction zone.

Figure 2:
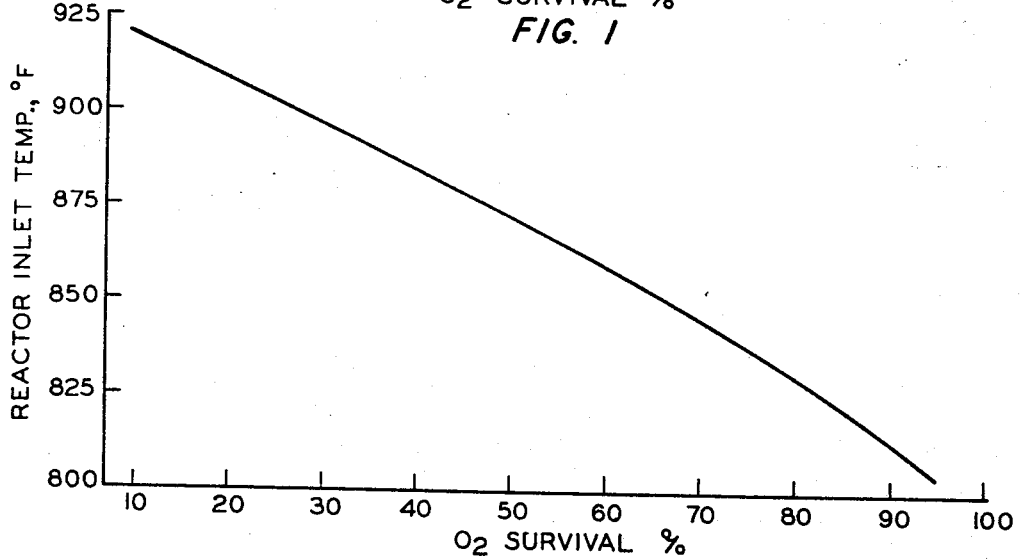
FIG. 2 is a graphic representation of the relationship between reactor inlet temperature and oxygen survival as a percent of the reactor inlet oxygen remaining unconsumed in the reactor effluent.

Referring now to FIG. 2, under the identical conditions employed for the establishment of that data in FIG. 1, it will be seen that the percentage oxygen survival or quantity of oxygen in the reactor effluent decreases essentially linearly with increasing reactor inlet temperature which in turn, is directly related to average reaction temperature of the reaction zone. Furthermore, the preferred oxygen survival of about 16 to about 18 percent, as determined from FIG. 1, will be realized at an inlet reaction temperature of about 910° F. to about 915° F.

From these data, it is seen that the process can be controlled to produce optimum and maximum yields of the primary product by monitoring or measuring the extent of a secondary reaction taking place within the reaction zone while adjusting a primary variable in accordance therewith.

One method of establishing the basis for such control is to determine yields of the primary reaction product and corresponding survivals of the secondary reactant, in terms of the percentage of its constant concentration in the reactor charge, as effected by the variation of a single primary variable and thereafter, to vary that single primary variable to obtain that survival of the secondary reactant corresponding to the maximum yield of the primary reaction product. Derivative methods therefrom would involve interrelating the secondary reactant in the effluent to maximum yields in terms of its difference from the concentration in the reactor charge.

The extent of such secondary reactions can be determined by measuring the concentration of any reactant taking part in such secondary reactions whose presence in the reaction zone is not a major driving force and using such control to adjust any variable which is a major driving force in the primary reaction.

In this respect, it will be appreciated that while through this discussion, mention has been made of controlling the temperature of the reactants to the reaction zone, the temperature of any other point in the reaction zone can similarly be used as a control. Specific reference has been made to the inlet temperature of the reactants simply because this temperature is more susceptible to close control.

Variable effect studies have been conducted at various reactor pressures and in all instances it was determined that the reactor temperature was one of the most significant primary process variables and that in each instance, control of this primary variable could be effected in relation to the concentration in the effluent of one of the reactants, the presence of which is not a primary variable. Further, it was determined that this relationship generally was applicable at all flow rates and that of the two aspects of the reaction which are of particular significance, that is, conversion and selectivity, conversion was more noticeably effected by the variation of the inlet reactor temperature, and the influence thereof on the conversion was the principal factor which acted to optimize production rates.

In further support of this concept, it was found that optimum oxidative dehydrogenation conditions could be controlled by interrelating oxygen content of the reactor effluent also to steam to butene molar ratio in the reactor charge and to contact time. However, both of these variables showed a lower order of influence on the process than did the reactor inlet temperature and both were less susceptible to close control.

Figure 4:
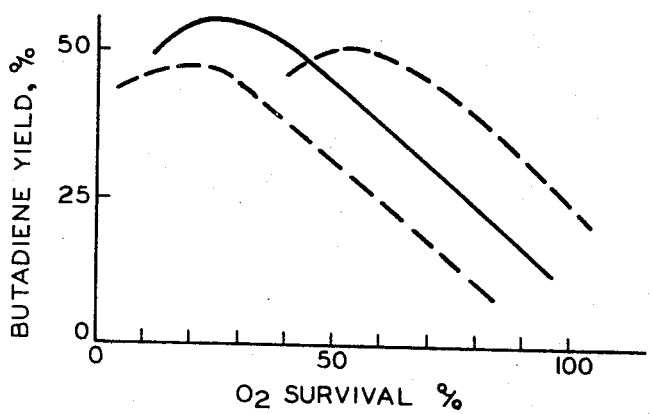
FIG. 4 is a graphic representation of the relationship between butadiene yield and percentage oxygen survival based on oxygen in the feed.

Referring now to FIG. 4, there is graphically presented the relationship between butadiene yield and oxygen survival as a percent of the oxygen in the feed, values being approximated for three general curves of varying oxygen to butene ratios in the feed, covering the range of 0.2 to 1.2 molal ratios of the general range of about 0.2 to about 2.0. The solid line is for the preferred oxygen to butene molal ratio of about 0.6 to about 0.8.

Figure 3:
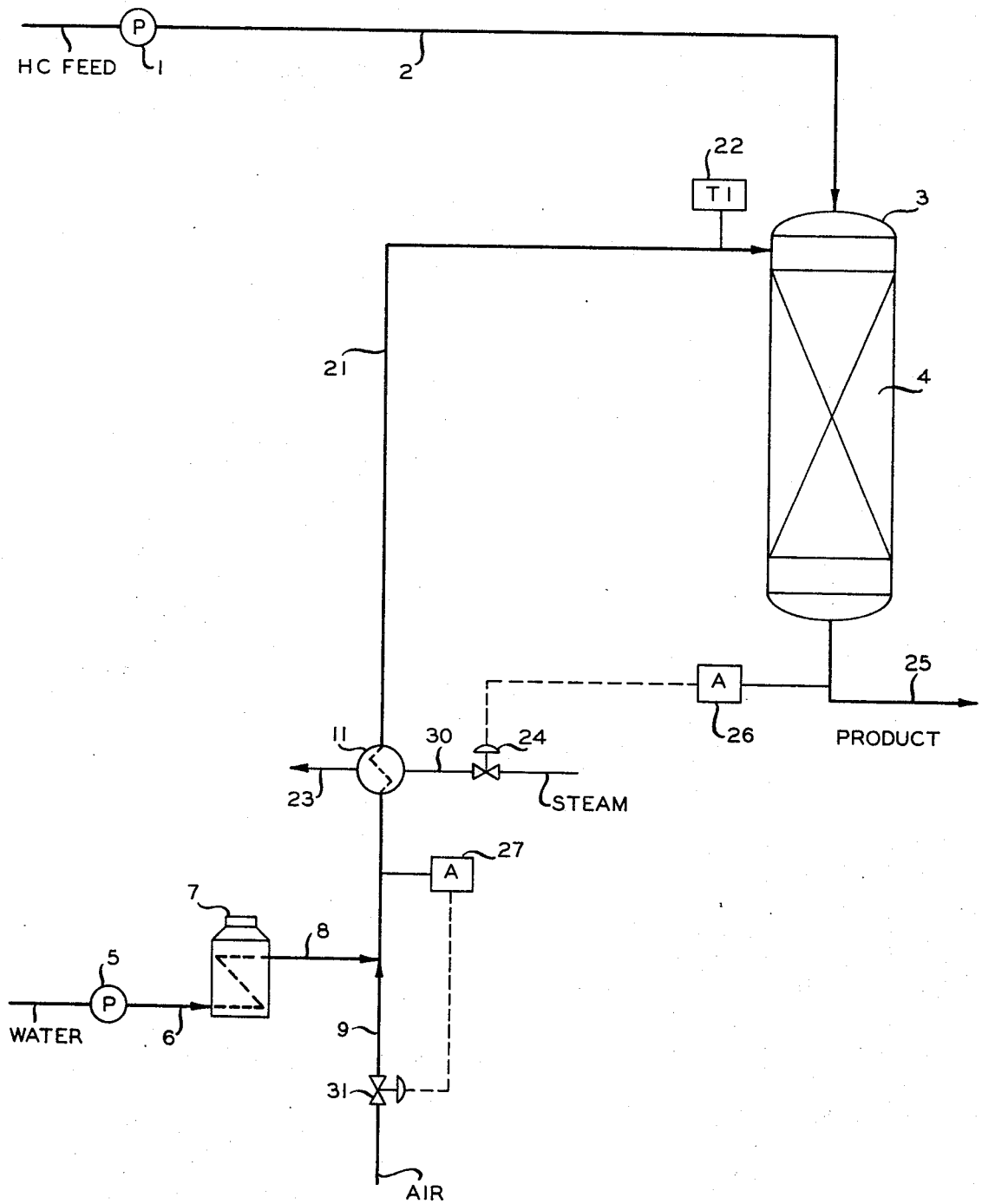
FIG. 3 is a schematic flow diagram embodying one method of employing the principles of this invention.

An embodiment of the principles of this invention as adapted to the oxidative dehydrogenation of olefinic hydrocarbons to produce conjugated diolefins will be more easily understood by referring to FIG. 3 which is a schematic diagram of one embodiment of the process.

Referring now to FIG. 3, hydrocarbon pump 1 supplies hydrocarbon containing the olefin to be dehydrogenated from a source not shown through conduit 2 to dehydrogenation reactor 3 containing catalyst bed 4.

Water pump 5 supplies water from a source not shown through conduit 6 into vaporizer 7 where the water is vaporized by any suitable means. The steam generated leaves vaporizer 7 through line 8 into which air is introduced through conduit 9, the combined mixture passing through line 10 into heater 11.

Heater 11 is of any suitable construction and has a variable heat output. For example, it may be an electrical heater, the output of which is varied by resistance; a steam heater, the output of which is varied by steam quantity input; or a direct fired heater, the output of which is varied by fuel input. In the present instance, heater 11 is depicted as a steam heater from which the heated air-water mixture leaves through conduit 21, the temperature thereof being indicated by temperature sensing means 22 prior to entry to reactor 3 above catalyst bed 4. Steam enters heater 11 through conduit 30 containing control valve 24 therein and condensate leaves heater 11 through condensate conduit 23.

The reaction mixture consisting of the steam-air mixture introduced to reactor 3 through conduit 21 and the hydrocarbon passes down through catalyst bed 4 and leaves the reactor through effluent conduit 25 having oxygen analyzer 26 located therein. Oxygen analyzer 26 is adapted to control the combined reactant inlet temperature to reactor 3 and so maintain the optimum oxygen content in the reactor effluent from reactor 3 in line 25. That is, if the oxygen content of the reactor effluent in line 24, as determined by analyzer 26, is too low, valve 24 in steam line 30 is caused to open to allow more steam into heater 11 and to so increase the temperature of the air-steam mix to reactor 3 through conduit 21. In a comparable manner, but limiting the amount of steam into heater 11 through valve 24, the temperature of the reactants introduced into reactor 3 through line 21 can be decreased.

Prior to heater 11 in conduit 10, there is located oxygen analyzer 27 which measures the oxygen content of that portion of the reactants introduced into reactor 3 through conduit 21. This analyzer 27 is used in maintaining the inlet oxygen content of the reactants in a specified range by effecting manual or automatic adjustment of valve 31 in air inlet conduit 9.

It will be appreciated that the above represents a simplified embodiment of the process of this invention and that variations can be employed without departing from the scope of the invention. Some of these could include such refinements as controlling the temperature of the material to reactor 3 by by-passing heater 11, controlling the temperature of a combined charge and measuring the oxygen content of the reactor effluent after gas and liquid separation instead of in total reactor effluent. These, and other modifications do not serve to remove the process from the scope of the invention.

It will be further appreciated that the invention as disclosed herein relative to the specific embodiment of oxidative dehydrogenation of an olefin, is applicable to any chemically active system embodying a plurality of chemical reactions comprising a principal reaction and at least one subsidiary or side reaction in which the extent of the side reaction can be employed to indicate the extent of the primary reaction and to provide a control for regulating one of the primary variables of the primary reaction.

What is claimed is:

1. In the process of oxidatively dehydrogenating olefins containing at least four carbon atoms to produce conjugated diolefins wherein a charge stream comprising said olefin, oxygen and steam is contacted with a catalyst at an elevated reaction temperature to convert said olefin to said conjugated diolefin contained in an effluent stream comprising oxygen, the improvement comprising measuring the concentration of said oxygen in said effluent stream and adjusting said reaction temperature responsive thereto to adjust the quantity of said conjugated diolefins in said effluent stream.

2. The process as defined in claim 1 in which the mole ratio of said oxygen to butene in said charge stream is maintained within the range of about 0.6 to about 0.8.

3. The process as defined in claim 2 in which the mole ratio of said oxygen to butene in said charge stream is maintained at about 0.69.

4. The process as defined in claim 1 in which said reaction temperature is adjusted by adjusting the inlet temperature of said charge stream.

5. The process is defined in claim 1 in which said reaction temperature is adjusted in relation to the measured concentration of said oxygen in said effluent stream in accordance with the curves of FIG. 1 and FIG. 2.

6. The process as defined in claim 1 in which the concentration of said oxygen in said effluent stream is maintained in the range of about 16 percent to about 18 percent of the oxygen content of said charge stream.

7. The process as defined in claim 1 in which said charge stream is introduced into said process at a temperature in the range of about 910° F. to about 915° F.

8. The process as defined in claim 6 in which said reaction temperature is adjusted by adjusting the inlet temperature of said charge stream.

9. The process as defined in claim 3 in which the concentration of said oxygen in said effluent stream is maintained in the range of about 16 percent to about 18 percent of the oxygen content in said charge stream, said charge stream being introduced into said process at a temperature in the range of about 910° F., to about 915° F., and said reaction temperature is adjusted in relation to the measured concentration of said oxygen in said effluent stream in accordance with the curves of FIG. 1 and FIG. 2.

10. The process as defined in claim 1 in which the mol ratio of said oxygen to butene in said charge stream is maintained within the range of from about 0.5 to about 1.0.

References Cited
UNITED STATES PATENTS

| | | | |
|---|---|---|---|
| 3,196,189 | 7/1965 | Ogle et al. | 260—680 E |
| 3,274,283 | 9/1966 | Bethell | 260—680 E |
| 3,294,859 | 12/1966 | Prater et al. | 260—683.2 |
| 3,320,329 | 5/1967 | Nolan | 260—680 |
| 3,497,449 | 2/1970 | Urban | 208—108 |

PAUL M. COUGHLAN, JR., Primary Examiner

U.S. Cl. X.R.

208—Dig. 1